(12) United States Patent
Chen et al.

(10) Patent No.: US 9,740,379 B2
(45) Date of Patent: Aug. 22, 2017

(54) METHODS AND SYSTEMS FOR CREATING AND USING ELECTRONIC COLORING PAGES

(71) Applicant: Flycatcher LTD, Kfar-Saba (IL)

(72) Inventors: Shay Chen, Hod Hasharon (IL); Tal Zilberman, Ganei Tikva (IL)

(73) Assignee: Flycatcher LTD, Kfar-Saba (IL)

( * ) Notice: Subject to any disclaimer, the term of this patent is extended or adjusted under 35 U.S.C. 154(b) by 0 days.

(21) Appl. No.: 15/060,038

(22) Filed: Mar. 3, 2016

(65) Prior Publication Data

US 2016/0259532 A1    Sep. 8, 2016

Related U.S. Application Data

(60) Provisional application No. 62/127,852, filed on Mar. 4, 2015.

(51) Int. Cl.
| | |
|---|---|
| G06T 11/20 | (2006.01) |
| G06F 3/0484 | (2013.01) |
| G06T 11/00 | (2006.01) |
| G06T 11/40 | (2006.01) |
| G06T 1/00 | (2006.01) |

(52) U.S. Cl.
CPC ........ *G06F 3/04845* (2013.01); *G06T 1/0007* (2013.01); *G06T 11/001* (2013.01); *G06T 11/40* (2013.01); *G06T 2200/24* (2013.01); *G06T 2210/62* (2013.01)

(58) Field of Classification Search
CPC ............................ G06T 11/203; G06T 7/0083
See application file for complete search history.

(56) References Cited

U.S. PATENT DOCUMENTS

| | | | | |
|---|---|---|---|---|
| 2008/0154931 A1* | 6/2008 | Jacobs | ..................... | H04L 67/22 |
| 2008/0284791 A1* | 11/2008 | Bressan | ............... | G06K 9/4638 345/589 |
| 2010/0092043 A1* | 4/2010 | Borman | ..................... | G06T 7/20 382/107 |
| 2011/0082735 A1* | 4/2011 | Kannan | ............. | G06F 17/30247 705/14.23 |
| 2013/0135347 A1* | 5/2013 | Inada | ..................... | G06T 11/60 345/629 |
| 2014/0223319 A1* | 8/2014 | Uchida | ............. | G06F 17/30277 715/739 |

* cited by examiner

*Primary Examiner* — Phi Hoang
(74) *Attorney, Agent, or Firm* — Michael J. Feigin, Esq.; Feigin & Fridman

(57) ABSTRACT

Generating an electronic coloring page image in the disclosed technology is accomplished by (a) obtaining an image to be converted into a the electronic coloring image; (b) converting the image into a corresponding outline image; (c) converting the corresponding outline image into an electronic coloring page image; (d) displaying the electronic coloring page image to a user; and (e) responsive to input provided by the user, manipulating the electronic coloring page image.

18 Claims, 5 Drawing Sheets

METHODS AND SYSTEMS FOR CREATING AND USING ELECTRONIC COLORING PAGES

FIELD AND BACKGROUND OF THE INVENTION

The invention, in some embodiments, relates to the field of computer based children's toys, and more specifically to methods and systems for creating and using electronic coloring pages.

SUMMARY

In accordance with an embodiment of the teachings herein, there is provided a method for generating an electronic coloring page image, the method including:

(a) obtaining an image to be converted into a the electronic coloring image;

(b) converting the image into a corresponding outline image;

(c) converting the corresponding outline image into an electronic coloring page image;

(d) displaying the electronic coloring page image to a user; and (e) responsive to input provided by the user, manipulating the electronic coloring page image.

In some embodiments, step (a) includes downloading an image from an electronic image repository. In other embodiments, step (a) includes using an image capturing device to capture the image.

In some embodiments, step (a) includes using the image capturing device to capture a plurality of images, and the method further includes selecting one of the plurality of images to be converted into the electronic coloring image, and carrying out steps (b)-(e) on the selected image.

In some embodiments, step (a) includes using the image capturing device to capture a plurality of images, step (b) includes converting each of the plurality of images into a corresponding plurality of outline images, and the method further includes selecting one of the plurality of outline images to be converted into the electronic coloring image, and carrying out steps (c)-(e) on the selected outline image. In some embodiments, the method further includes, prior to selecting, displaying the plurality of outline images to the user to generate a visual effect of an outline image stream or an outline video.

In some embodiments, step (b) includes using edge detection to generate the outline image. In other embodiments, step (b) includes comparing the image to images in an outline image database and selecting from the database an outline image corresponding to the image.

In some embodiments, the method further includes, prior to step (c):

receiving from the user input regarding at least one desired characteristic of the outline image; and modifying the outline image to include the at least one desired characteristic, the at least one desired characteristic selected from the group consisting of a desired outline color, a desired background color, and absence of filling colors.

In some embodiments, the method further includes communicating the outline image to a remote location, and storing the outline image in the remote location. In some such embodiments, the storing includes associating at least one identifier of the user with the outline image.

In some embodiments, step (c) includes:

generating a background image layer including at least a background color for the electronic coloring page image;

generating an outline mask layer outline mask layer including only an outline color for the electronic coloring page image and being transparent in all other locations;

generating a filling image layer including any filling colors included in the initial outline layer; and stacking the background image layer, the filling image layer, and the outline mask layer in an image stack to generate the electronic coloring page image.

In some embodiments, the background image layer includes the outline color but does not include the filling colors.

In some embodiments, step (e) includes at least one of coloring the electronic coloring page image, erasing color from the electronic coloring page image, adding at least one electronic sticker to the electronic coloring page image, and removing at least one electronic sticker from the electronic coloring page image.

In some embodiments, during step (e), outlines of the electronic coloring page image remain visible regardless of the type of manipulation applied by the user.

In accordance with another embodiment of the teachings herein, there is further provided a system for creating and using an electronic coloring page image, including:

a user input device;

a display; and a processor functionally associated with the user input device and with the display, the processor including:

an image obtaining module, adapted to obtain an image to be converted into the electronic coloring page image;

an outline image generating module functionally associated with the image obtaining module and adapted to convert the image into a corresponding outline image;

a layering module, functionally associated with the outline image generating module and adapted to convert the outline image into an electronic coloring page image; and a coloring module functionally associated with the layering module and adapted to display the electronic coloring page image to the user on the display and to modify the electronic coloring page image in response to user input received via the user input device.

In some embodiments, the image obtaining module is functionally associated with at least one electronic image repository and adapted to download the image therefrom. In some embodiments, the image obtaining module is functionally associated with an image capturing device adapted to capture an image and to provide the captured image to the image obtaining module as the image to be converted.

In some embodiments, the image capturing device is adapted to capture a plurality of images, and the outline image generating module is adapted to receive from the user input device a user selection of one of the plurality of images to be converted into the outline image.

In some embodiments, the image capturing device is adapted to capture a plurality of images, the outline image generating module is adapted to convert the plurality of images into a corresponding plurality of outline images, and the layering module is adapted to receive from the user input device a user selection of one of the plurality of outline images to be converted into the electronic coloring page image. In some embodiments, the layering module is adapted to exhibit the plurality of outline images to the user on the display to generate a visual effect of an outline image stream or an outline video.

In some embodiments, the outline image generating module is adapted to compare the image to images in an outline image database and to select from the database an outline image corresponding to the image.

In some embodiments, the layering module is adapted to:
receive from the user, via the user input device, input regarding at least one desired characteristic of the outline image; and
modify the outline image to include the at least one desired characteristic, the at least one desired characteristic selected from the group consisting of a desired outline color, a desired background color, and absence of filling colors.

In some embodiments, the system further includes a communication module adapted to communicate the outline image to a remote location for storage thereon.

In some embodiments, the layering module is adapted to:
generate a background image layer including at least a background color for the electronic coloring page image;
generate an outline mask layer outline mask layer including only an outline color for the electronic coloring page image and being transparent in all other locations;
generate a filling image layer including any filling colors included in the initial outline layer; and
stack the background image layer, the filling image layer, and the outline mask layer in an image stack to generate the electronic coloring page image.

In some embodiments, the background image layer includes the outline color but does not include the filling colors.

In some embodiments, the coloring module is adapted to modify the electronic coloring page image by at least one of coloring the electronic coloring page image, erasing color from the electronic coloring page image, adding at least one electronic sticker to the electronic coloring page image, and removing at least one electronic sticker from the electronic coloring page image.

In some embodiments, the coloring module is adapted to maintain outlines of the electronic coloring page image visible regardless of the type of modification applied to the electronic coloring page image.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

The invention, in some embodiments, relates to the field of computer based children's toys, and more specifically to methods and systems for creating and using electronic coloring pages from any image captured in the surrounding environment.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

Figure 1:
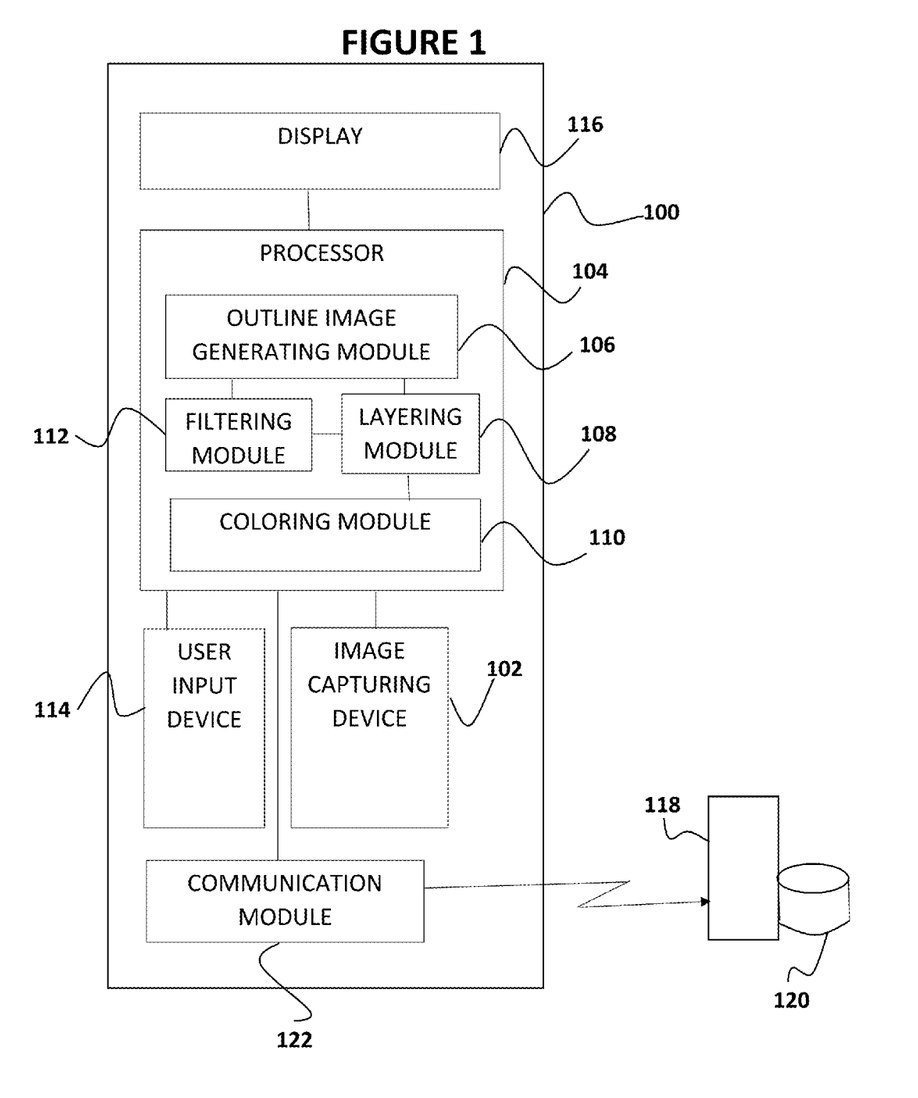
FIG. 1 is a simplified block diagram representation of an embodiment of a system for creating and using electronic coloring pages according to the teachings herein.

Reference is now made to FIG. 1 is a simplified block diagram representation of an embodiment of a system 100 creating and using electronic coloring pages according to the teachings herein. The system 100 may be implemented using any suitable computing means, such as tablet computers, laptop computers, suitably equipped desktop computers, suitably equipped mobile telephones such as smart phones, and the like.

As seen in FIG. 1, system 100 includes an image capturing device 102, such as a video camera or a stills camera, which is configured to capture images at an image capturing rate, such as, for example, 30 frames per second. Image capturing device 102 is functionally associated with a processor 104 which includes multiple software modules, each configured to be activated or run by the processor, for example as a separate thread or process.

In some embodiments, processor 104 includes an outline image generating module 106 configured to identify contours or edges in a captured image and to generate a corresponding outline image. In the context of the teachings herein, an outline image is defined as an image in which all elements of the image are outlined by lines in an outline color. The outline image may include only two colors, such as a background color and an outline color, or may include multiple colors, such as a background color, an outline color, and one or more filling colors, different from the background color and outline color, filling outlined areas of the image.

Outline image generating module 106 is functionally associated with a layering module 108, included in processor 104 and configured to create multiple layers of an outline image, for example as generated by outline image generating module 106, to form an electronic coloring page image. In the context of the teachings herein, an electronic coloring page image is defined as an outline image that the user may manipulate, for example by adding colors to the image and/or erasing colors from the image, without affecting the outlines of the image.

Functionally associated with layering module 108 is a coloring module 110, included in processor 104 and configured to make changes to an electronic coloring page image, for example as generated by layering module 108, in response to user input. For example, the changes may include adding color to portions of the image, erasing color from portions of the image, adding decorative elements, also termed electronic stickers, to portions of the image, and/or removing electronic stickers from portions of the image. It is appreciated that changes made by the coloring module 110 would not change the outlines defined in the electronic coloring page image being manipulated. Coloring module 110 may implement electronic coloring methods known in the art or may use commercially available electronic coloring applications, such as Painting Lulu™.

In some embodiments, outline image generating module 106 and/or layering module 108 are functionally associated with a filtering module 112, included in processor 104 and configured to change or set the background color and/or outline color of an outline image or an electronic coloring page image.

Processor 104 is functionally associated with a user input device 114 and with a display 116. The user input device 114 may be any suitable user input device, such as a keyboard, a computer mouse, a touch screen, a stylus, a voice recognition module, or any other suitable input device. In some embodiments, the user input device 114 and the display 116 may be a single device, such as a touch-screen display.

In some embodiments, processor 104 is communicably associated with a data server 118 and a database 120, typically via one or more communication modules 122 forming part of system 100. Additionally, communication modules 122 may enable communication between system 100 and another system 100 or another computing device.

Figure 2:
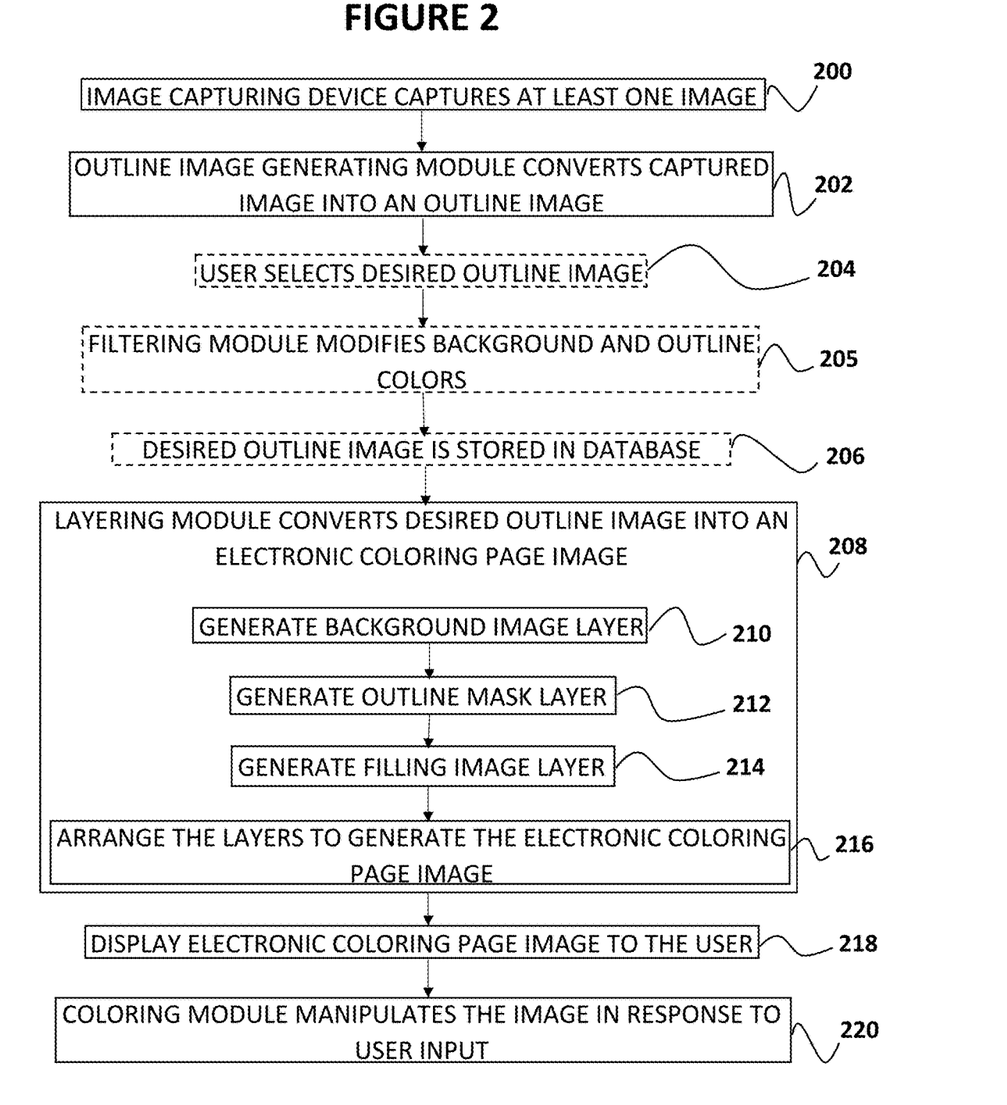
FIG. 2 is a flow chart of an embodiment of a method for creating and using electronic coloring pages according to the teachings herein, for example using the system of FIG. 1.

Reference is now additionally made to FIG. 2, which is a flow chart of an embodiment of a method for creating and using electronic coloring pages according to the teachings herein, for example using the system 100 of FIG. 1. It is appreciated that though the description hereinbelow relates to specific elements of system 100 shown in FIG. 1, this is merely an example used to enhance clarity, and any suitable device may be used in implementation of the method of FIG. 2.

Figure 3A:
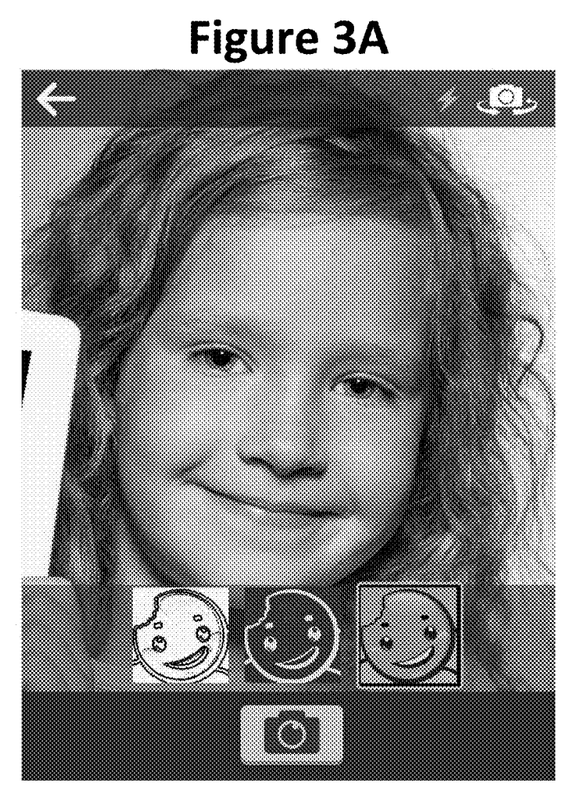
FIGS. 3A-3C are exemplary screen shots corresponding to steps of the method of FIG. 2 according to the teachings herein.

As seen in FIG. 2, at step 200 image capturing device 102 captures images of the surrounding environment. In some embodiments, a single image is captured, whereas in other embodiments multiple images are captured at an image capturing rate, for example not less than 15 frames per second, not less than 30 frames per second, or not less than 60 frames per second. An example of a captured image is shown in FIG. 3A.

Figure 3B:
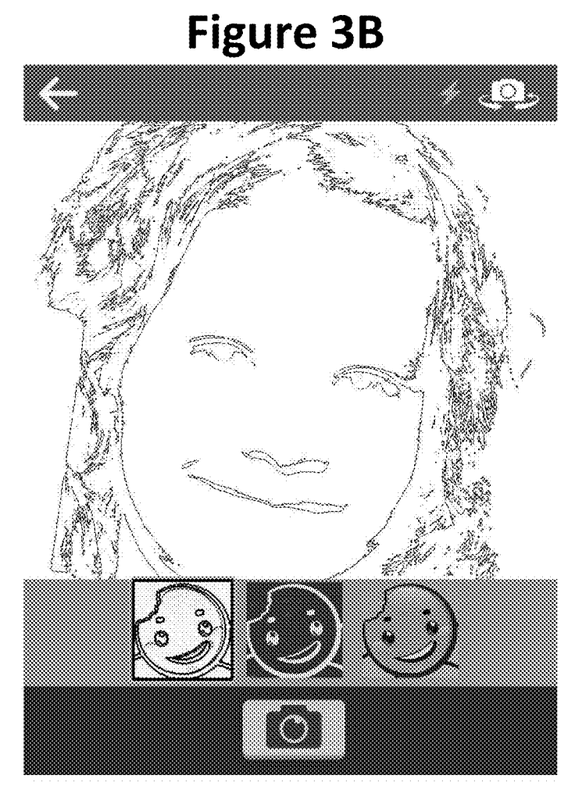

At step 202, outline image generating module 106 running on processor 104 converts each frame captured by image capturing device 102 into an outline image, and presents the outline image to the user on display 116. In some embodiments, outline image generating module 106 uses edge detection methods as known in the art to identify edges in the captured image, and those edges are used to generate the outlines of the outline image. In some embodiments, outline image generating module 106 is associated with an outline image database, and compares the captured image to images in the database in order to find a matching outline image to be used. An example of the outline image corresponding to the captured image of FIG. 3A is shown in FIG. 3B. It is appreciated that the outline image of FIG. 3B has undergone color filtering, as explained hereinbelow with reference to step 205.

In some embodiments, where the image capturing device 102 captures multiple frames in an image capturing rate, each frame is processed by outline image generating module 106 and displayed to the user on display 116, so that at the user end the received visual effect is of an outline image stream or outline video. In some such embodiments, the user may interact with user interface 114 to indicate a desired frame to be captured and further processed, for example by pressing a suitable button on interface 114 or by touching a touchscreen display 116 when the desired frame is displayed, as seen at step 204.

In some embodiments, once the desired image frame is captured, the user may interact with user interface 114 to select a specific background color and a specific outline color. In such embodiments, filtering module 112 modifies the created outline image, using methods known in the art, to include the colors specified by the user, and/or to remove filling colors from the image, and displays the modified image to the user, as seen at step 205. As seen, FIG. 3B has undergone filtering to have a white background color, black outline color, and no filling colors, for example due to user interaction with icons at the bottom of the display as shown in FIG. 3B.

In some embodiments, at step 206 the desired outline image selected by the user at step 204 and/or modified by filtering module 112 at step 205 may be transmitted by processor 104 to server 118 via communication module 122, and may be stored in database 120. In some embodiments, server 118 and database 120 include a profile for each user, and the outline image is associated, on database 120, with the profile of the specific user who captured the image. In other embodiments, images are stored in database 120 without being associated with specific users.

Turning to step 208, it is seen that the layering module 108 converts the desired outline image into an electronic coloring page, in multiple layering steps as described herein. Specifically, at step 210, layering module 108 generates a background image layer including the background color and, in some embodiments, also the outline color, but no filling colors. In some embodiments, the background image does not include the outline color. At step 212, layering module 108 generates an outline mask layer, which is a layer including only the outline color, and transparent in all other locations of the image, such that when overlaid over the background image layer the appearance is equivalent to that of the initial outline image. At step 214, layering module generates the filling image layer, which includes all filling colors included in the initial outline layer. In some embodiments, the filling image layer is transparent in all locations which were in the outline color in the initial outline image. In some embodiments, the filling image layer includes the outline color, but is transparent in all locations which were in the background color in the initial outline image. In some embodiments, in which the initial outline image did not include any filling colors, the filling image layer is a transparent layer. Finally, at step 216, the background image layer, the filling image layer, and the outline mask layer arranged over one another in an image stack to generate the electronic coloring page image. Specifically, the background image layer is arranged at the bottom of the image stack, the outline image is arranged at the top of the image stack, with the filling image layer being arranged between them. The thus generated electronic coloring page image is displayed to the user on display 116 at step 218.

Figure 3C:
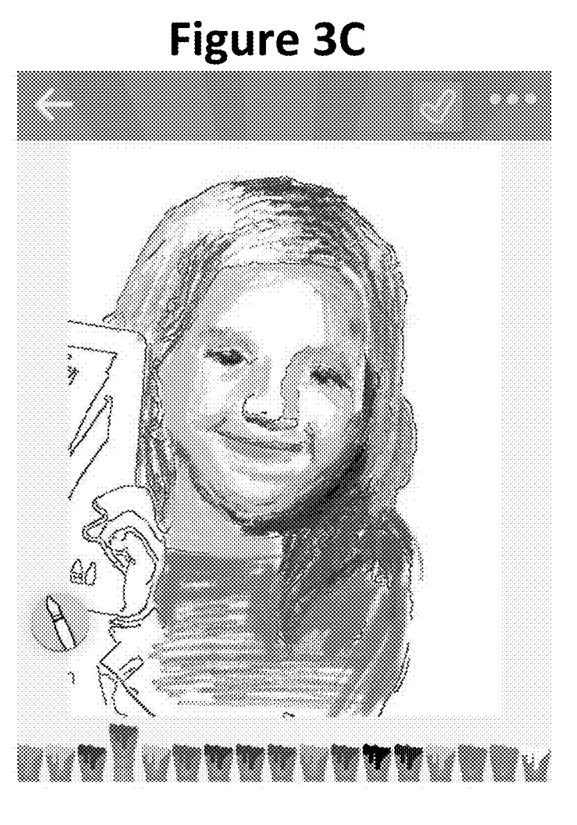

The user may then interact with user interface 114 to manipulate the displayed image, for example to color parts of the electronic coloring book image, erase parts of the electronic coloring book image, add electronic stickers to the electronic coloring book image or remove electronic stickers therefrom. Responsive to user manipulation of the user interface 114, coloring module 110 manipulates the electronic coloring page image, such that the outlines remain visible regardless of manipulation of the image. Specifically, colors and electronic stickers are added to and/or removed from the filling image layer, such that the outlines visible to the user, which are part of the outline mask overlaying the filling image layer, remains unchanged regardless of changes made by the user. Additionally, when colors and/or electronic stickers are removed from the filling image layer, the background image layer is exposed, creating the effect of erasing the colors and/or electronic stickers. An example of the image of FIG. 3B, following manipulation by a user, is shown in FIG. 3C.

In some embodiments, responsive to user interaction with user interface 114 (e.g. hitting a "save" button), the manipulated electronic coloring page image may be transmitted by communication module 122 to server 118 and stored in database 120 associated therewith, for example as part of the user profile for the user who manipulated the image.

In some embodiments, responsive to user interaction with user interface 114 (e.g. hitting a "share" button or opening an email application), the manipulated electronic coloring page image may be transmitted by communication module 122 to another device, external to system 100. For example, the manipulated image may be transmitted by communication module 122 to a printer for printing thereof on paper or may be emailed to another user. As another example, the manipulated image may be transmitted by communication module 122 to a networked server, for example for publication or sharing in a social network.

It is a particular feature of the teachings herein that the method may be used by children to electronically edit, or "color", a coloring page that they started coloring on paper, by applying the method of FIG. 2 to a captured image of the partially colored paper.

It is appreciated that any one or more of the processing steps described in FIG. 2 may be carried out on server 118 instead of being carried out directly in system 100. For example, the image(s) captured by image capturing device 102 at step 200 may be transmitted by communication module 122 to server 118, such that the generation of corresponding outline images (step 202) is carried out on the server, and the resulting outline images may be transmitted back to system 100 for display thereof. Similarly, conversion of the outline image to an electronic coloring book image (steps 208 to 216) may be carried out on server 118.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A method for generating an electronic coloring page image, the method comprising:
   (a) obtaining an image to be converted into a said electronic coloring image;
   (b) converting the image into a corresponding outline image;
   (c) converting said corresponding outline image into an electronic coloring page image;
   (d) displaying said electronic coloring page image to a user; and
   (e) responsive to input provided by said user, manipulating the electronic coloring page image;
   step (c) further comprising generating a background image layer including at least a background color for said electronic coloring page image;
   generating an outline mask layer outline mask layer including only an outline color for said electronic coloring page image and being transparent in all other locations;
   generating a filling image layer including any filling colors included in the initial outline layer; and
   stacking said background image layer, said filling image layer, and said outline mask layer in an image stack to generate said electronic coloring page image.

2. The method of claim 1, wherein step (a) comprises downloading an image from an electronic image repository.

3. The method of claim 1, wherein step (a) comprises using an image capturing device to capture said image.

4. The method of claim 3, wherein step (a) comprises using said image capturing device to capture a plurality of images, the method further comprising:
   (f) selecting one of said plurality of images to be converted into said electronic coloring image; and
   (g) carrying out steps (b)-(e) on said selected image.

5. The method of claim 3, wherein step (a) comprises using said image capturing device to capture a plurality of images, step (b) comprises converting each of said plurality of images into a corresponding plurality of outline images, the method further comprising:
   (f) selecting one of said plurality of outline images to be converted into said electronic coloring image; and
   (g) carrying out steps (c)-(e) on said selected outline image.

6. The method of claim 1, further comprising, prior to step (c):
   receiving from said user input regarding at least one desired characteristic of the outline image; and
   modifying said outline image to include said at least one desired characteristic,
   said at least one desired characteristic selected from the group consisting of a desired outline color, a desired background color, and absence of filling colors.

7. The method of claim 1, wherein said background image layer includes said outline color but does not include said filling colors.

8. The method of claim 1, wherein step (e) comprises at least one of coloring said electronic coloring page image, erasing color from said electronic coloring page image, adding at least one electronic sticker to said electronic coloring page image, and removing at least one electronic sticker from said electronic coloring page image, while outlines of said electronic coloring page image remain visible regardless of the type of modification to the electronic coloring page image.

9. A method for generating an electronic coloring page image, the method comprising:
   (a) obtaining an image to be converted into a said electronic coloring image;
   (b) converting the image into a corresponding outline image;

(c) converting said corresponding outline image into an electronic coloring page image;

(d) displaying said electronic coloring page image to a user; and (e) responsive to input provided by said user, manipulating the electronic coloring page image; wherein said step of converting the image into a corresponding outline image further comprises comparing said image to images in an outline image database and selecting from said database an outline image corresponding to said image.

10. A system for creating and using an electronic coloring page image, comprising:

a user input device;

a display; and a processor functionally associated with said user input device and with said display, said processor comprising:

an image obtaining module, adapted to obtain an image to be converted into said electronic coloring page image;

an outline image generating module functionally associated with said image obtaining module and adapted to convert said image into a corresponding outline image;

said outline image generating module further adapted to compare said image which was obtained to images in an outline image database and to select from said database an outline image corresponding to said image;

a layering module, functionally associated with said outline image generating module and adapted to convert said outline image into an electronic coloring page image; and a coloring module functionally associated with said layering module and adapted to display said electronic coloring page image to said user on said display and to modify said electronic coloring page image in response to user input received via said user input device.

11. The system of claim 10, said image obtaining module being functionally associated with at least one electronic image repository and adapted to download said image therefrom.

12. The system of claim 10, said image obtaining module being functionally associated with an image capturing device adapted to capture an image and to provide said captured image to said image obtaining module as said image to be converted.

13. The system of claim 12, wherein said image capturing device is adapted to capture a plurality of images, and said outline image generating module is adapted to receive from said user input device a user selection of one of said plurality of images to be converted into said outline image.

14. The system of claim 12, wherein said image capturing device is adapted to capture a plurality of images, said outline image generating module is adapted to convert said plurality of images into a corresponding plurality of outline images, and said layering module is adapted to receive from said user input device a user selection of one of said plurality of outline images to be converted into said electronic coloring page image.

15. The system of claim 10, wherein said layering module is adapted to:

receive from said user, via said user input device, input regarding at least one desired characteristic of the outline image; and modify said outline image to include said at least one desired characteristic, said at least one desired characteristic selected from the group consisting of a desired outline color, a desired background color, and absence of filling colors.

16. The system of claim 10, said layering module adapted to:

generate a background image layer including at least a background color for said electronic coloring page image;

generate an outline mask layer outline mask layer including only an outline color for said electronic coloring page image and being transparent in all other locations;

generate a filling image layer including any filling colors included in the initial outline layer; and stack said background image layer, said filling image layer, and said outline mask layer in an image stack to generate said electronic coloring page image.

17. The system of claim 16, wherein said background image layer includes said outline color but does not include said filling colors.

18. The system of claim 10, wherein said coloring module is adapted to modify said electronic coloring page image by at least one of coloring said electronic coloring page image, erasing color from said electronic coloring page image, adding at least one electronic sticker to said electronic coloring page image, and removing at least one electronic sticker from said electronic coloring page image, while maintaining outlines of said electronic coloring page image visible regardless of the type of modification applied to the electronic coloring page image.

* * * * *